United States Patent [19]

Shinozaki et al.

[11] Patent Number: 4,714,126
[45] Date of Patent: Dec. 22, 1987

[54] FOUR-WHEEL DRIVE VEHICLE

[75] Inventors: Takashi Shinozaki; Takeshi Kawaguchi, both of Saitama, Japan

[73] Assignee: Honda Giken Kogyo Kabushiki Kaisha, Tokyo, Japan

[21] Appl. No.: 21,556

[22] Filed: Mar. 2, 1987

Related U.S. Application Data

[63] Continuation of Ser. No. 836,228, Feb. 28, 1986, abandoned.

[30] Foreign Application Priority Data

Dec. 28, 1982 [JP] Japan .................. 57-232860

[51] Int. Cl.$^4$ .......................................... B60K 17/34
[52] U.S. Cl. ..................... 180/233; 180/251;
280/95 R; 280/663; 280/701; 280/725
[58] Field of Search ............... 180/233, 241, 239, 242,
180/251, 215, 217; 280/161, 21 R, 282, 696,
701, 269, 93, 96.1, 660, 663, 724, 725, 95 R

[56] References Cited

U.S. PATENT DOCUMENTS

| | | | |
|---|---|---|---|
| 25,279 | 11/1903 | Sturmey | 280/93 |
| 644,590 | 3/1900 | Frantz | 180/244 |
| 1,784,875 | 12/1930 | Jesswein | 280/269 |
| 1,987,791 | 1/1935 | Opolo | 280/93 |
| 2,919,139 | 12/1959 | Rupp, II | 280/269 |
| 3,893,533 | 7/1975 | Tidwell | 180/233 |
| 4,070,032 | 1/1978 | Cunningham | 280/282 |
| 4,088,199 | 5/1978 | Trautwein | 280/269 |
| 4,179,135 | 12/1979 | Slater | 280/66 U |
| 4,325,449 | 4/1982 | D'Addio et al. | 180/217 |
| 4,360,224 | 11/1982 | Sato et al. | 280/269 |

FOREIGN PATENT DOCUMENTS

| 595871 | 7/1959 | Italy | 280/696 |
|---|---|---|---|
| 120504 | 7/1984 | Japan | 180/251 |

Primary Examiner—John J. Love
Assistant Examiner—Eric Culbreth
Attorney, Agent, or Firm—Lyon & Lyon

[57] ABSTRACT

A four-wheel drive vehicle having straddle-type seating. A power train is located beneath the seat and between the footpegs of the vehicle, the engine employs parallel output shafts located on either side of the crankshaft to drive power transmission means to the front and rear axles. A speed change mechanism is contained within the engine case along with the output shafts and includes a first transmission shaft between the crankshaft and one of the output shafts. The arrangement of the frame is such that the upper portion of the frame is narrower than the lower portion of the frame for appropriate rider comfort and footpeg location. The wheels are located such that the front and rear tracks are substantially the same and diagonals between the wheel centers cross close to the center of gravity of the vehicle. The cushion assemblies of the vehicle are inclined to increase cushion stroke and the steering assembly is arranged with crossing tie bars for maximum steering control with minimum mechanical complexity.

6 Claims, 10 Drawing Figures

FOUR-WHEEL DRIVE VEHICLE

This application is a continuation, of application Ser. No. 836,228 filed Feb. 28, 1986 now abandoned.

BACKGROUND OF THE INVENTION

The field of the present invention is four-wheel drive vehicles of the type wherein the rider straddles the vehicle and more specifically the configuration and layout of the suspension and steering of such vehicles.

Small cross-country vehicles generally of the type where the rider straddles the vehicle are intended for rugged terrain and advantageously employ suspension systems and steering capable of accommodating such terrain and maintaining vehicle stability. Additionally, the design must accommodate reasonable rider control and comfort while providing stability and toughness.

With such vehicles where the rider straddles the vehicle, relative mechanical simplicity, lightness and compactness are advantageous. Mechanical simplicity results in reduced costs, increased reliability and the ability to effect repairs and maintenance in the field. By the vehicle being relatively lightweight, the rider is allowed greater control through the use of his own body weight. Compactness results in less compromise with regard to rider position and the like. Certain of the foregoing requirements for handling, stability, mechanical simplicity, lightness and compactness are somewhat competing. Consequently, careful attention to design is necessary to maximize these considerations.

SUMMARY OF THE INVENTION

The present invention is directed to a four-wheel drive vehicle of the type wherein the rider straddles the vehicle. The vehicle employs front and rear swing arms and a direct type steering assembly. To reduce complexity and component requirements, a first aspect of the present invention includes the orientation of cushion assemblies associated with the swing arm suspension which are appropriately angled to increase stroke and advantageously incorporate the frame of the vehicle. With increased stroke length, less complicated damping mechanisms are necessary and less structural demands are placed on the system.

In a second aspect of the present invention, the steering system of the vehicle is arranged for maximum rider control without mechanical complications. Tie rods from the steering system cross and extend forwardly of the axle for optimum steering capability with minimum mechanical complexity.

Accordingly, it is an object of the present invention to provide an improved four-wheel drive vehicle of the type wherein the rider straddles the vehicle. Other and further objects and advantages will appear hereinafter.

DETAILED DESCRIPTION OF THE PREFERRED EMBODIMENTS

Figure 1:
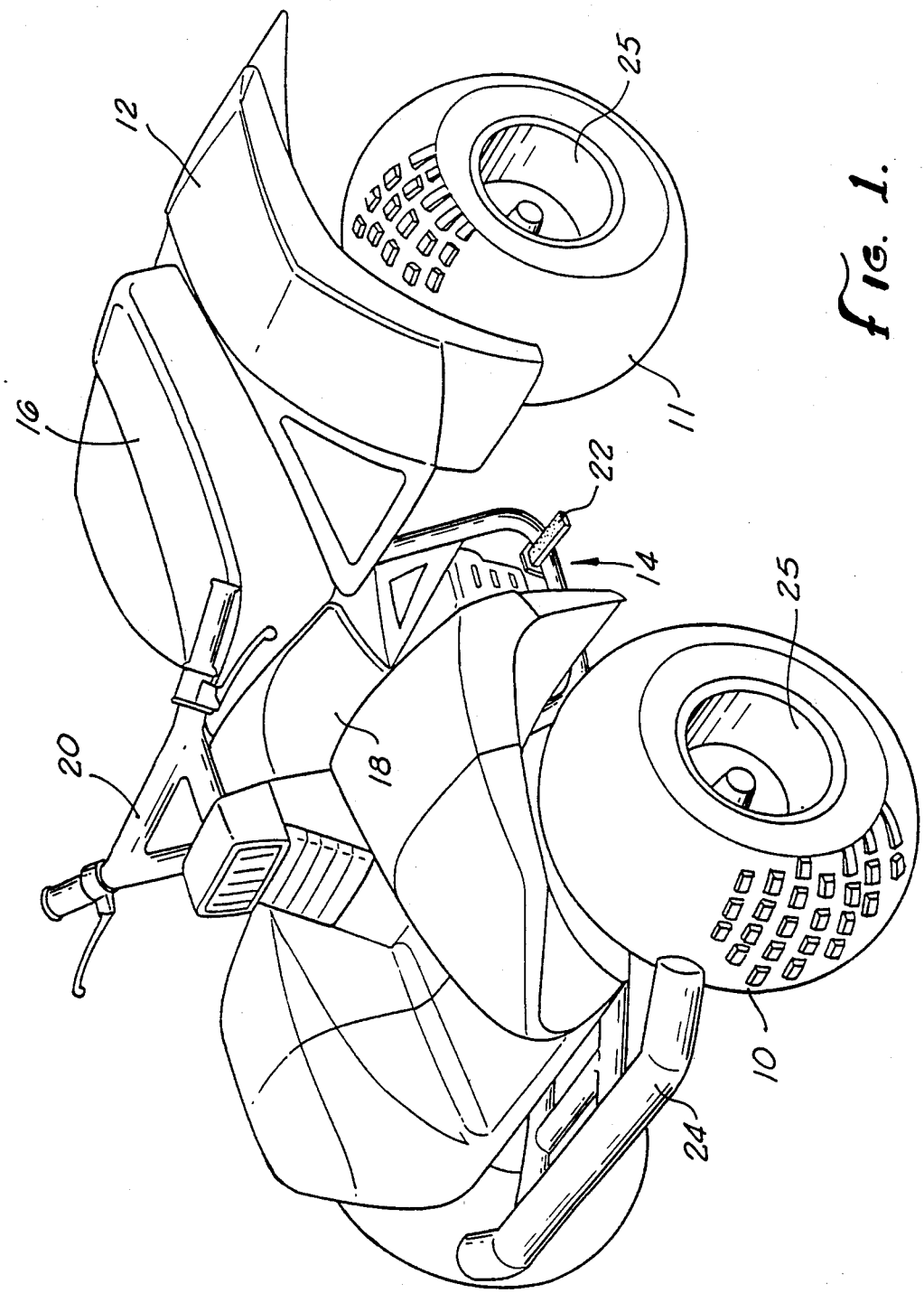
FIG. 1 is an oblique view of a four-wheeled vehicle contemplated for employment of the present invention.

Turning in detail to the drawings, a four wheel vehicle is illustrated in FIG. 1 as including four high flotation tires 10 and 11, a body 12 and a frame 14. Positioned centrally on the vehicle is a seat 16 and a fuel tank 18. The vehicle is shown to have a handlebar-type steering mechanism 20. Footpegs 22 extend laterally from either side of the vehicle and are fixed to the frame 14. A bumper 24 extends forwardly of the front tires 10.

Figure 3:
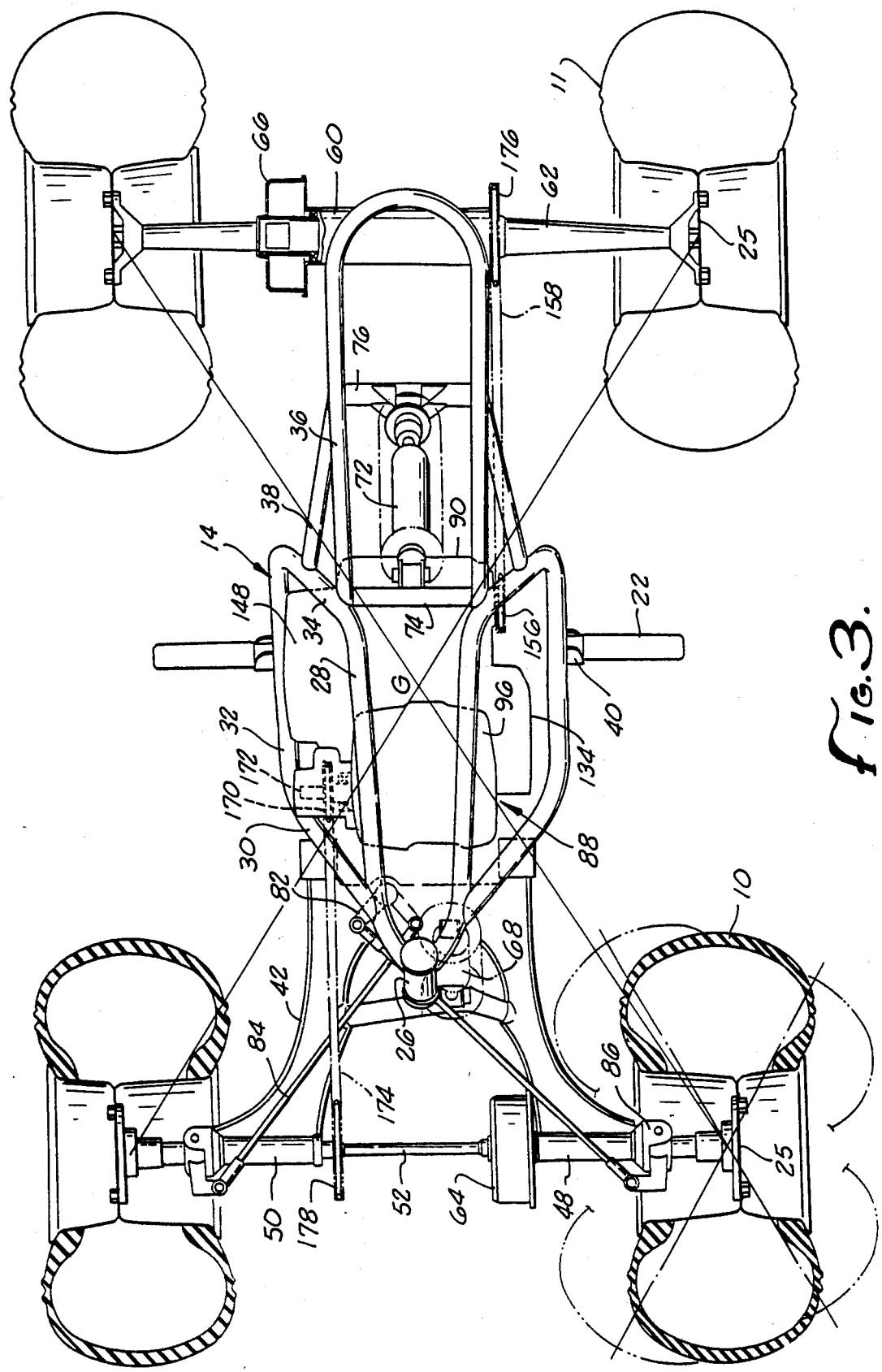
FIG. 3 is a plan view of the frame and power train of the vehicle of FIG. 2.

The front tires 10 have a track which is substantially equal to the track of the rear tires 11. Diagonals extending from the centers of the wheels 25 associated with each tire 10 and 11 defines a point G located centrally on the vehicle as best seen in FIG. 3. Because of the similarity of components fore and aft on the vehicle and because of the location of the engine centrally on the vehicle, this point G is approximately at the center of gravity of the vehicle.

Figure 2:
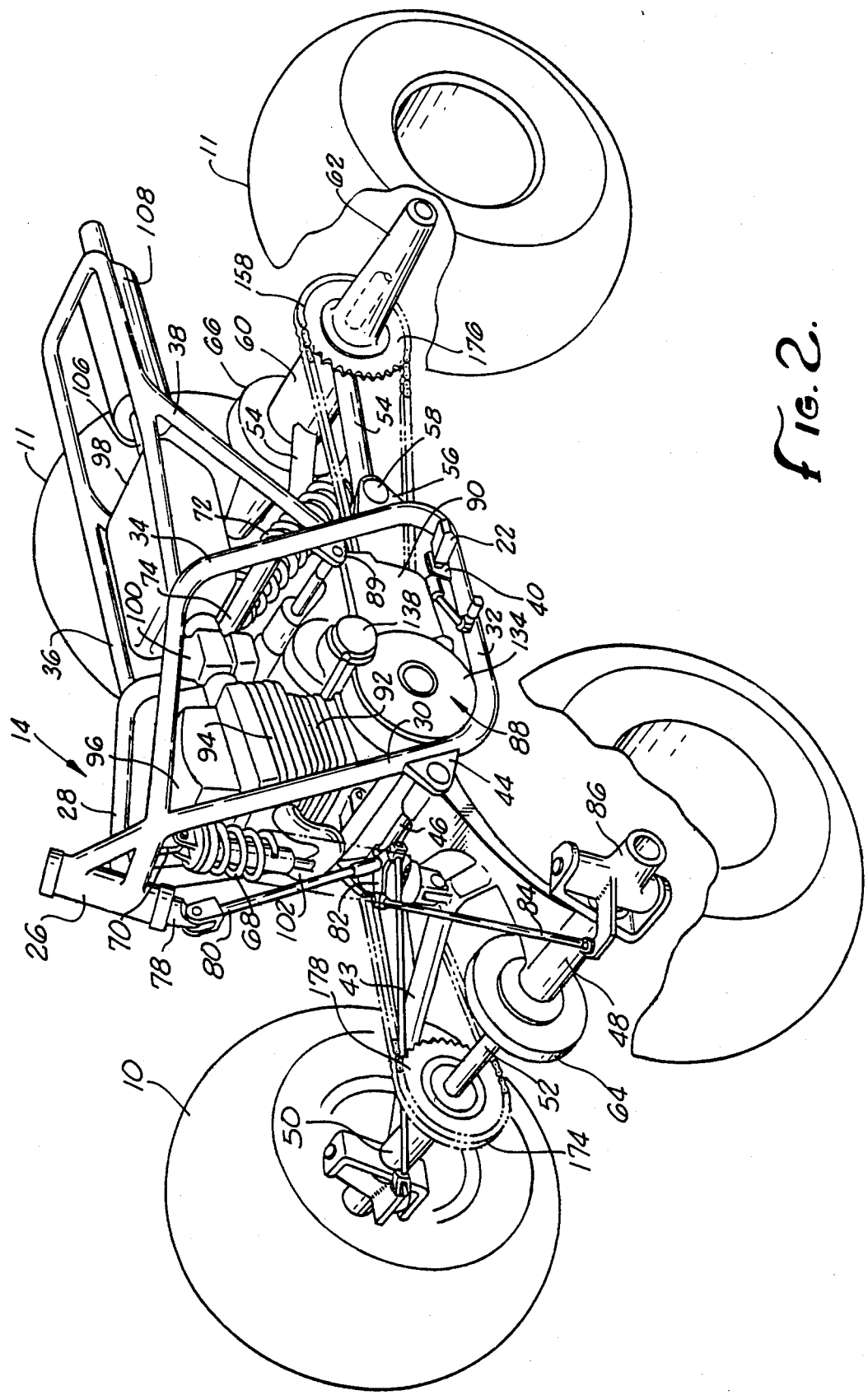
FIG. 2 is an oblique view of the vehicle of FIG. 1 with the body removed for clarity of illustration.
Figure 4:
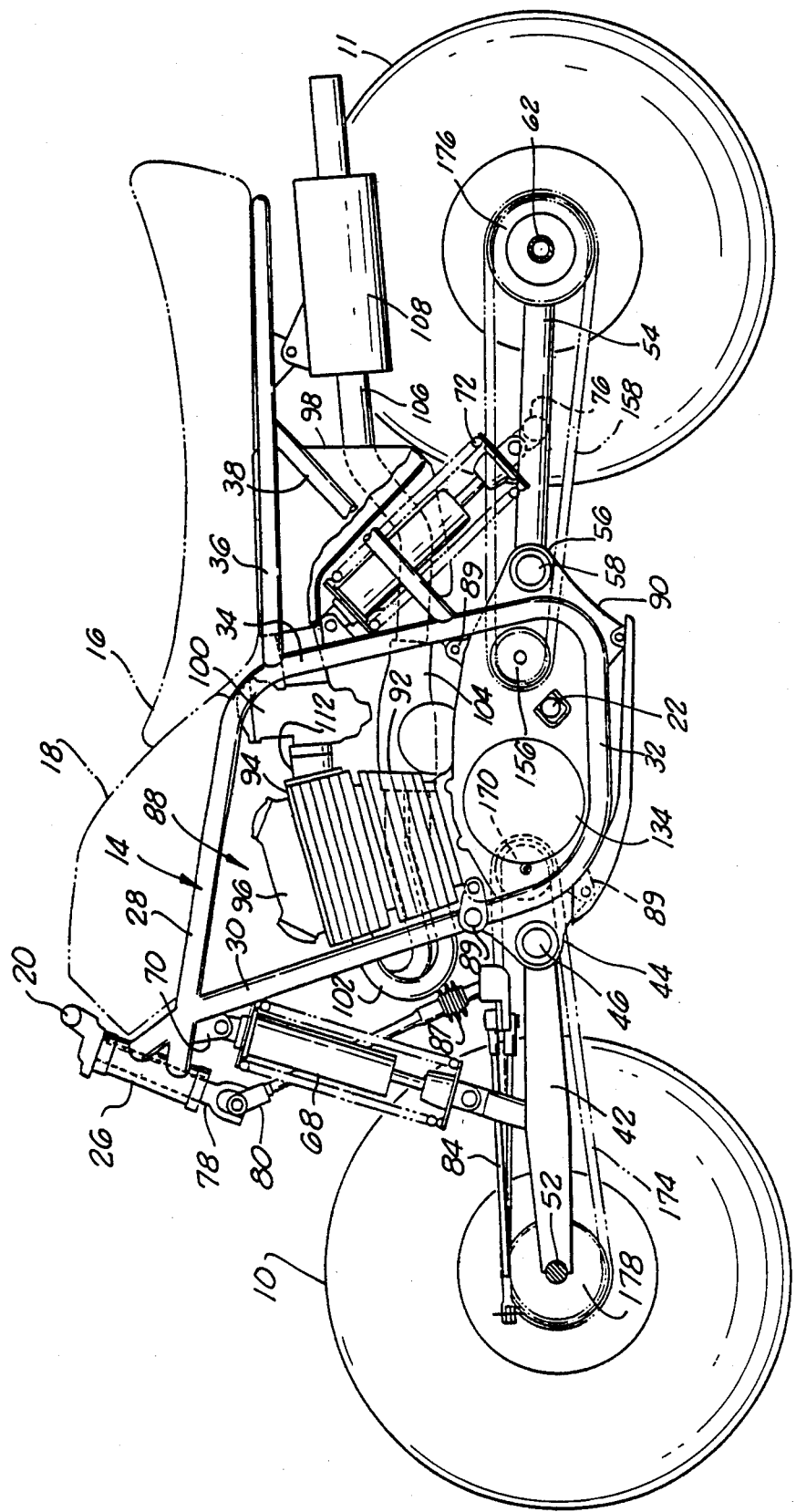
FIG. 4 is an elevation of the vehicle of FIG. 2 with the left front and left rear wheels removed for clarity.
Figure 5:
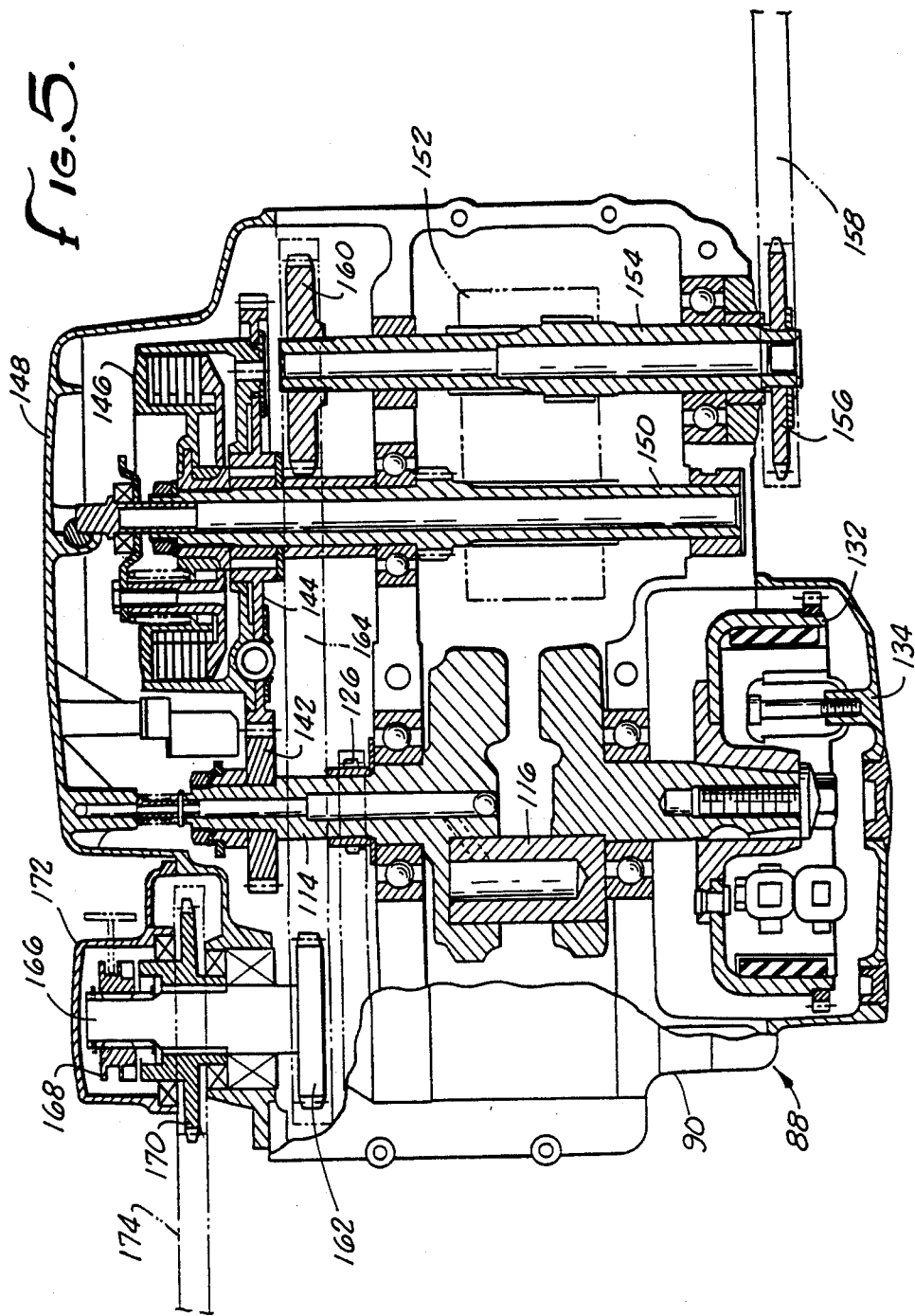
FIG. 5 is a cross-sectional plan view of the engine of the present invention taken along the center line of the shafts therein.

Looking in greater detail to the frame 14, FIGS. 2, 3 and 4 illustrate the frame structure of the first embodiment. A head pipe 26 is located forwardly of the main frame structure. The frame structure 14 includes main frame pipes 28 of which there are two. Down tubes 30 of which there are also two extend downwardly from the head pipe 26 and include rearward extensions 32. Center tubes 34 extend downwardly from the main frame pipes 28 to meet the rearward extensions 32 of the down tubes 30. The configuration of the frame is such that the rearward extensions 32 of the down tubes 30 are spaced wider than the main frame pipes 28 as can best be seen in FIG. 3. Extending rearwardly from the main frame body are seat rails 36 supported by rear stays 38. As noted above, the footpegs 22 are fixed to the frame 14 at two brackets 40 which are fixed to the rearward extensions 32 of the down tubes 30.

The brackets 40 are preferably adjustable to accommodate the rider. However, the brackets 40 remain located laterally adjacent the center of gravity of the vehicle. The location of the footpegs as determined by the brackets 40 places the weight of the rider when cornering near the center of gravity of the vehicle. Thus, shifting of the rider's weight does not unbalance the central position of the center of gravity of the vehicle. Thus, shifting of the rider's weight does not unbalance the central position of the center of gravity of both rider and vehicle which might otherwise excessively unload either the front or rear tires.

Associated with the frame 14 are front and rear suspension systems. A front swing arm 42 is pinned to two front brackets 44 located on the down tubes 30 by means of a front pivot shaft 46 extending between the brackets 44. The front swing arm 42 is shown to be symmetrical, extending in two swing arm elements with a cross member 43 all of unitary construction. Two supporting journals 48 and 50 are arranged at the forward end of the front swing arm 42 to receive a drive axle shaft 52 for driving the front wheels 10. The two swing arm elements are preferably curved to accommodate the steering action of the front wheels 10. The bumper 24 is illustrated in FIG. 2 as being fixed to the front swing arm 42.

The rear suspension includes a rear swing arm 54 pivotally pinned to pivot brackets 56 by a rear pivot shaft 58. The rear swing arm 54 extends rearwardly to a supporting journal 60 which receives a rear drive axle shaft 62. Inboard front and rear brakes 64 and 66 include elements fixed to the swing arms 42 and 54, respectively, and drive axle shafts 52 and 62, respectively, employed in a conventional manner.

The front swing arm 42 is associated with a cushion assembly 68 extending from a pivot bracket 70 to the cross member 43. The axis of the cushion assembly 68 is conveniently displaced from the center line of the vehicle in order to accommodate the steering mechanism and to locate the upper bracket 70 at an appropriate location. The cross member 43 is arranged such that the lower end of the cushion assembly 68 is specifically located outside of the angle defined by the tie rods 84 discussed below.

A rear cushion assembly 72 is similarly associated with the rear swing arm 54. The rear cushion assembly 72 is conveniently oriented on the axis of the vehicle and extends between a cross member 74 of the frame 14 and a cross member 76 of the rear swing arm 54.

The steering linkage associated with the handlebar steering mechanism 20 extends through the head pipe 26 including a steering stem 78. The steering stem 78 is pivotally associated with a connecting rod 80 to transmit rotational position to a steering link 82 pivotally mounted to the front swing arm 42. The steering stem 78 and the connecting rod 80 are shown to be inclined in opposite directions. The association of the connecting rod 80 with the steering link 82 and with the steering stem 78 are illustrated in greatest detail in FIG. 4 as including universal couplings.

Because the steering link 82 is pivotally mounted to the front swing arm 42, the steering link 82 moves relative to the rod 80. By placing the steering link 82 close to the pivot axis of the front swing arm 42, this motion is kept to a minimum. To accommodate the limited motion, the rod 80 may be arranged in two pieces allowed to slide axially relative to one another and splined to prevent relative rotation therebetween. A dust cover 87 covers the joint.

The steering link 82 is pivotally coupled with tie rods 84 which cross and extend to steering hubs 86 at the ends of the front axle shaft 52. The front ends of the tie rods 84 are associated with the steering hubs 86 at the forward end of the steering hubs. This location of the connection between the steering hubs 86 and the tie rods 84 provides more control of the wheels with less steering movement. There is additionally more freedom in layout of the front wheels. The wheels are located and arranged such that minimum interference with the air flow to the engine is experienced.

The orientation of the front cushion assembly 68, as best seen in FIG. 4, is designed for a larger cushion stroke. To this end, the attachment of the cushion assembly 68 to the cross member 43 is forwardly of the brackets 70. With the increase in angle, the cushion stroke is increased. This results in more freedom in the cushion mechanism design and adds to the capacity of the cushion assembly. Likewise, the rear cushion assembly 72 is also inclined as can best be seen in FIG. 4. With the rear cushion assembly 72, the cross member 74 is located well ahead of cross member 76 on the vehicle. This results in the inclination of the cushion assembly 72.

Located centrally within the frame 14 and supported thereby is an engine and power output assembly, generally designated 88. The engine 88 may be assembled with the frame 14 by inserting the engine from underneath and fixing it to the mounts 89 provided. The engine and power output assembly 88 generally includes an engine case 90, a cylinder block 92, a head 94 and a head cover 96. The engine intake system includes an air cleaner 98 and a carburetor 100. The exhaust system includes exhaust pipes 102, a manifold 104, a tail pipe 106 and a muffler 108. The exhaust pipes extend around one side of the engine inside of the frame 14 and the tail pipe 106 is attached to one of the seat rails 36.

The engine 88 includes the crankcase and transmission case as one structural unit. The cylinder block 92 extends from the upper portion of the engine case 90. The engine includes a crankshaft 114 which, in the embodiment of FIG. 2, extends transversely of the vehicle. Associated with the crankshaft 114 is a crankpin 116. A connecting rod extends from the crankpin 116 into the cylinder block 92 and is connected by means of a wrist pin to a piston in a conventional manner.

Associated with a first end of the crankshaft 114 is an alternating current generator 132. A generator housing 134 extends over the generator 132. From the other end of the crankshaft 114, a first reduction gear 142 drives a second reduction gear 144 which in turn drives a clutch assembly 146. The clutch assembly 146 may be manually actuated in a conventional manner. Surrounding the end of the crankshaft and the clutch assembly 146 is a clutch cover 148.

Driven by the clutch assembly 146 when engaged is a first transmission shaft 150. The first transmission shaft 150 is associated with a speed change transmission 152 which cooperates to provide varying output ratios to a second transmission shaft 154. The second transmission shaft 154 also is an output shaft. The output shaft 154, the first transmission shaft 150 and the crankshaft 114 are aligned in parallel in a plane. Conveniently for fabrication of the bearing seats, the plane of the shafts is also the part line for the upper and lower portions of the engine case 90.

The output shaft 154 extends outwardly from the engine case 90 to one side of the generator cover 134. At this external location, a drive sprocket 156 engages a drive chain 158 as part of a power transmission means to the rear axle shaft 62. Thus, power is directed from the engine through the crankshaft 114, the clutch assembly 146, the first transmission shaft 150, the speed change transmission 152, the output shaft 154, the drive sprocket 156 and the drive chain 158 to the rear wheels.

To provide power to the front wheels, the output shaft 154 includes a power transmission sprocket 160. A driven sprocket 162 located at the opposite side of the engine from the power transmission sprocket 160 is coupled thereto by means of a power transmission chain 164. An output shaft 166 extends outwardly from the engine case 90 on the opposite side of the engine from the drive sprocket 156. This output shaft 166 may be manually coupled by means of an engagement mechanism 168 to a drive sprocket 170. A cover 172 surrounds the engagement mechanism 168. The drive sprocket 170 is located to one side of the clutch cover 148 and extends no further out than the clutch cover 148. The drive sprocket provides power to a drive chain 174 providing a power transmission means to the front drive axle shaft 52.

The power transmission means including the drive sprockets 156 and 170, the drive chains 158 and 174 and driven sprockets 176 and 178 associated with the drive axle shafts 62 and 52, respectively, are displaced on the drive axle shafts 62 and 52 from the inboard rear brake 66 and inboard front brake 64, respectively. By locating the driven sprockets and brakes, there is no concentration of power and braking control. The chains may be independently covered as well. Also for convenience, the front and rear swing arms may be the same shape.

Figure 6:
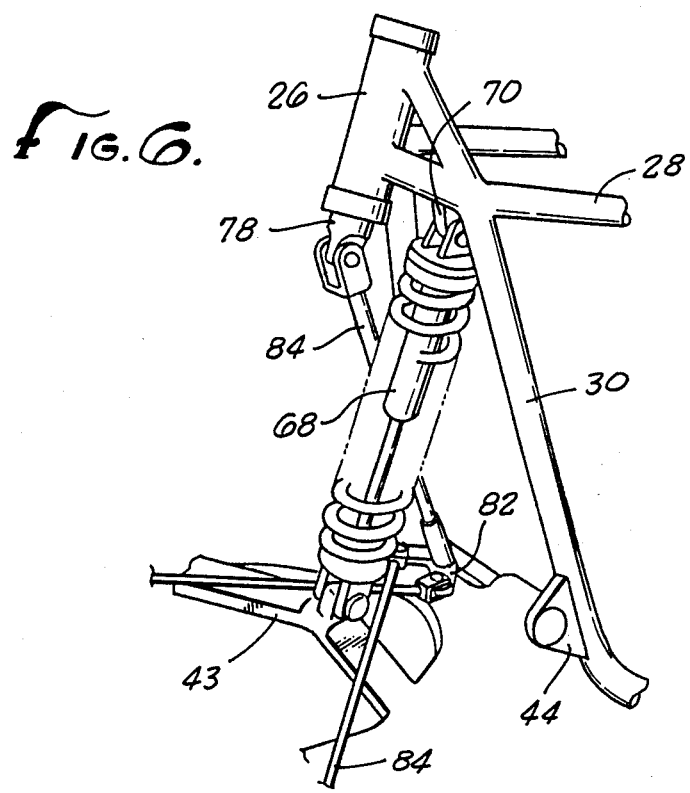
FIG. 6 is a detailed oblique view of the front cushion system of the vehicle of FIG. 2.
Figure 7:
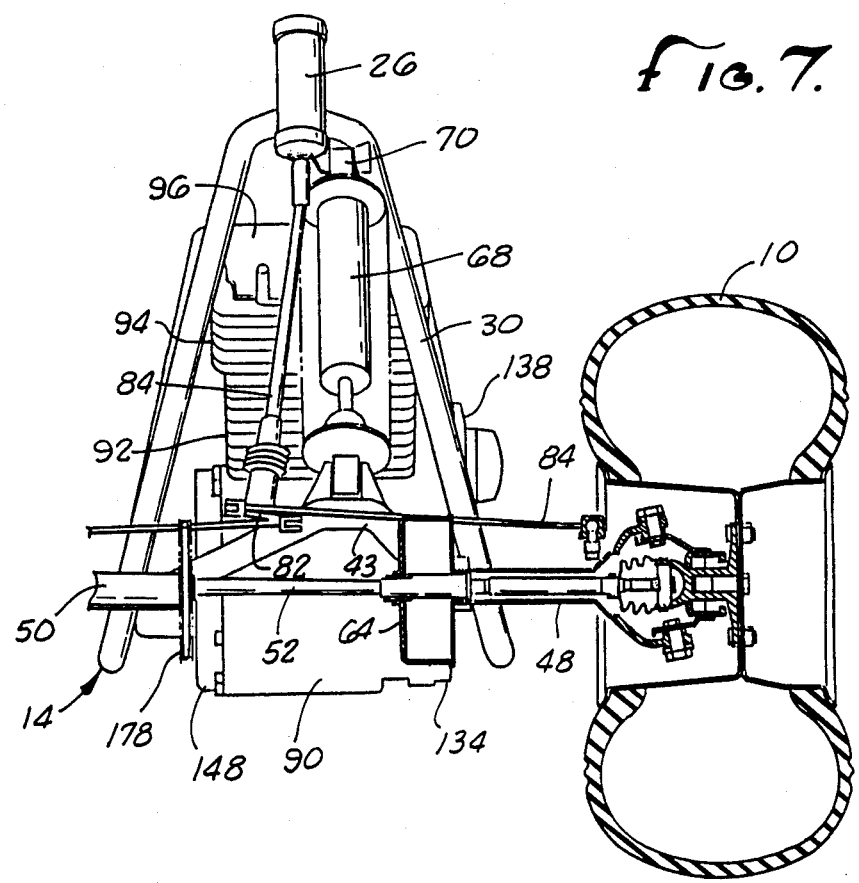
FIG. 7 is a front view of the vehicle of FIG. 2.

The embodiment of FIG. 2 may be modified slightly as illustrated in FIG. 6. In FIG. 6, the cross member 43 is located in the angle formed by the crossing tie rods 84. This location allows the lower end of the cushion assembly 68 to be positioned more centrally on the vehicle and located forwardly as well.

Figure 8:
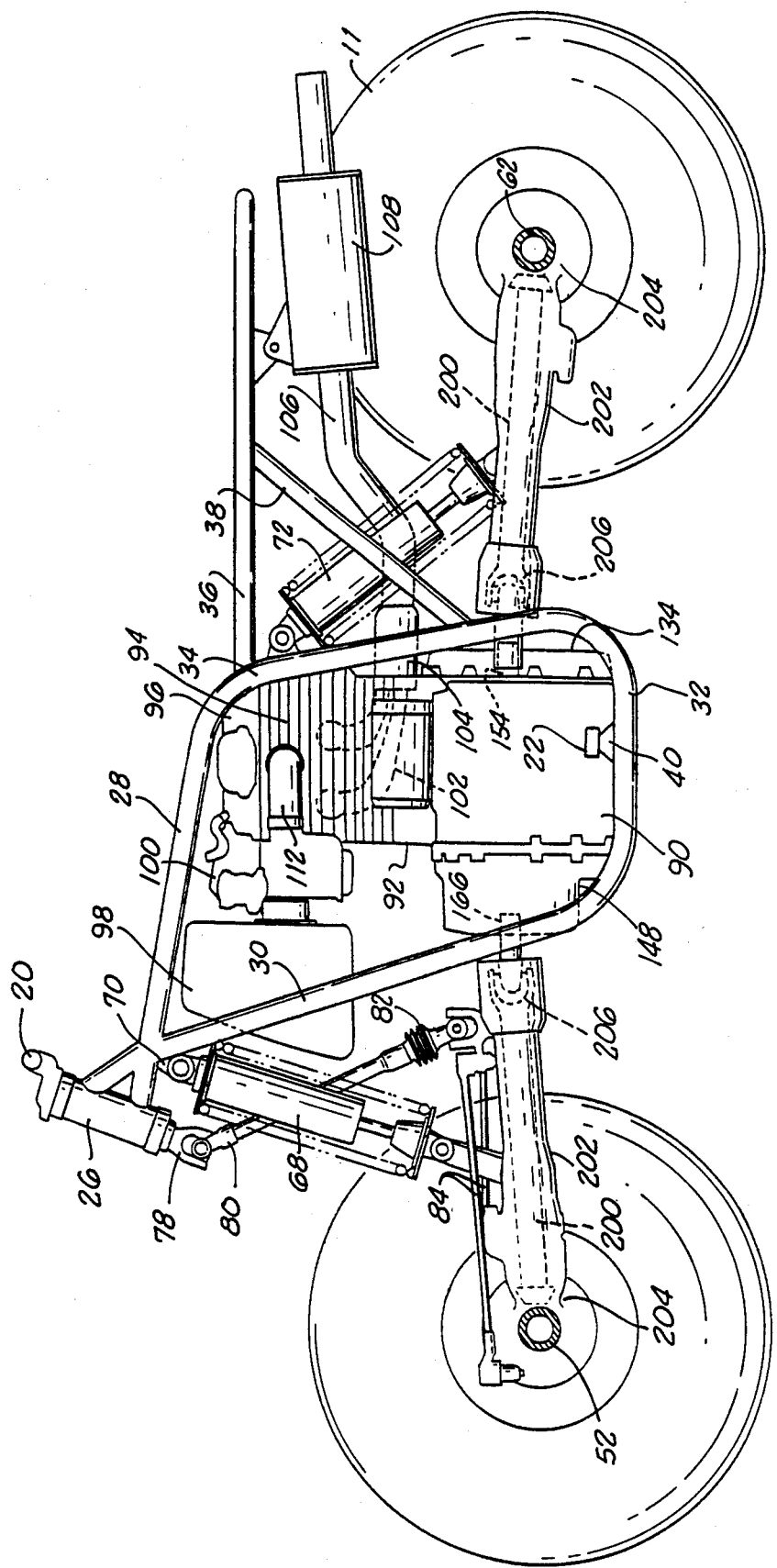
FIG. 8 is a side elevation of a second embodiment of the present invention with the left front and left rear wheels removed for clarity of illustration.
Figure 9:
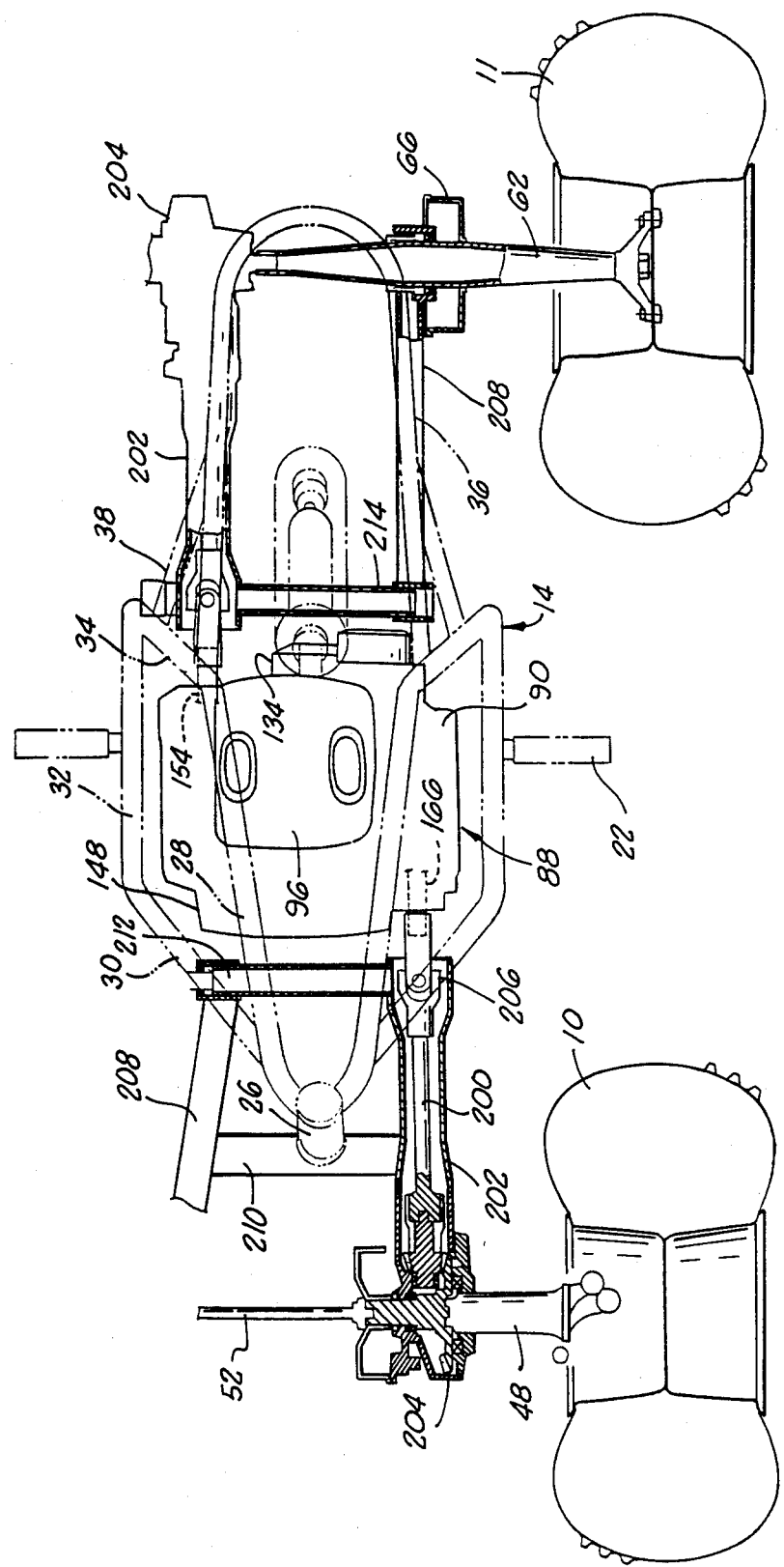
FIG. 9 is a plan view of the embodiment of FIG. 8.
Figure 10:
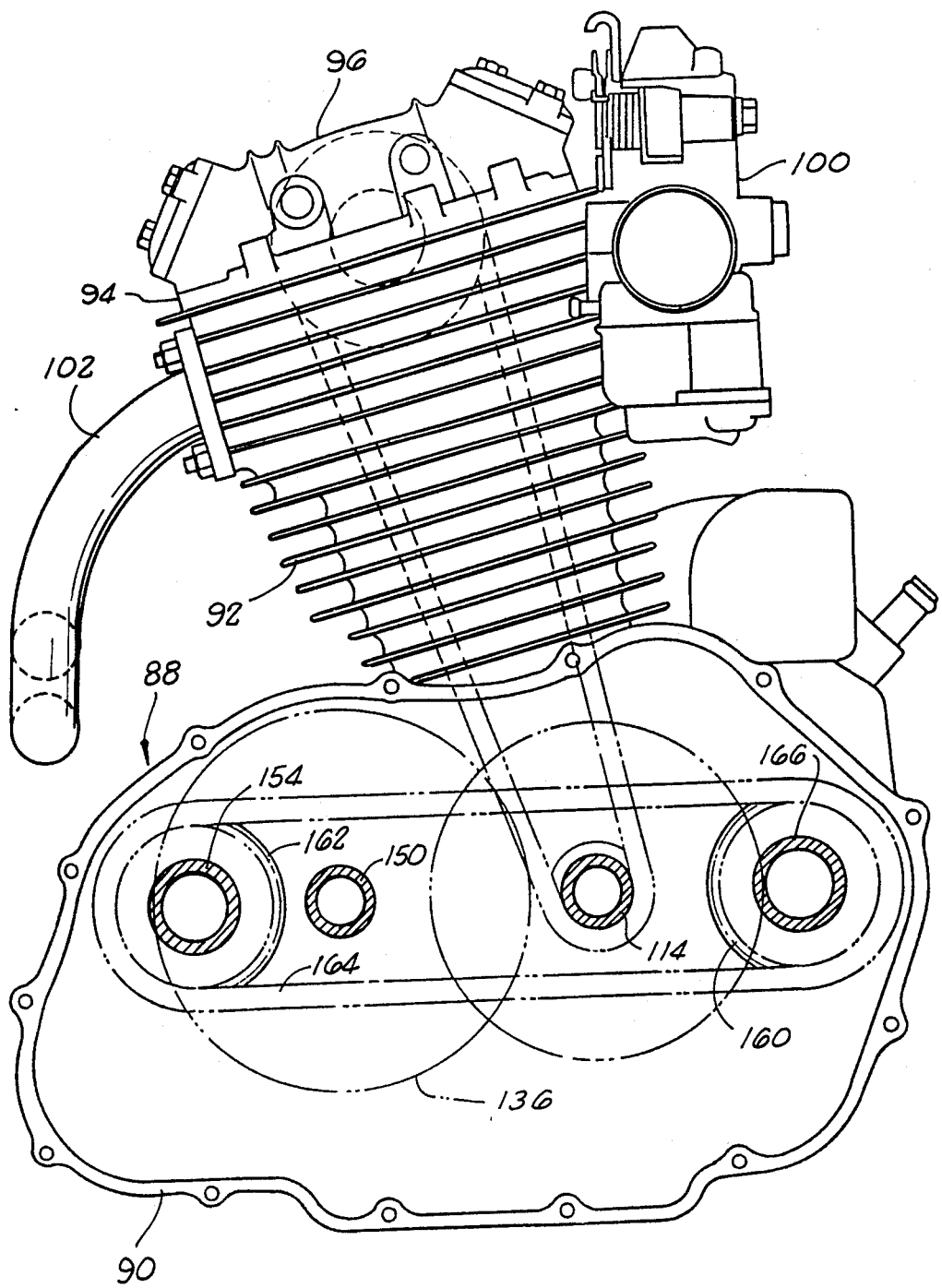
FIG. 10 is a detailed view of the engine of the embodiment of FIG. 8.

Turning next to the embodiment of FIGS. 8 through 10, identical reference numerals are employed where identical or equivalent components are illustrated. The emobidment of FIG. 8 is chiefly distinguished from that of FIG. 2 by the employment of shaft drives, the orientation of the engine with the crankshaft extending longitudinally of the vehicle and the orientation of the cylinder block relative to the engine case. Features having substantial similarity to the foregoing embodiment of FIG. 2 are not specifically discussed with reference to the embodiment of FIG. 8. Thus, the foregoing discussion is incorporated with reference to this second embodiment.

As stated above, a first distinction over the first embodiment is the orientation of the engine and power output assembly 88 with the crankshaft 114 extending longitudinally of the vehicle. The output shafts 154 and 156 similarly extend fore and aft parallel to the crankshaft 114. This orientation of the engine 88 is preferable for coupling with a power transmission means incorporating drive shafts. The output shafts 154 and 166 remain accessible from opposite sides of the engine. The location of the output shafts 154 and 166 allow the engine to be of minimum dimension and avoid complication associated with gearing necessary to circumvent the clutch assembly.

The power transmission means deriving power from the output shafts 154 and 166 include enclosed drive shafts of substantially identical design. The drive shafts 200 are contained within housings 202 forming part of the swing arms. A gear box 204 is positioned about each axle 52 and 62 and includes beveled gearing. At the other end of each drive shaft 200 is a universal joint 206 to allow flexure of the drive line.

The front and rear swing arms include the housings 202 and a spaced member 208 as can best be seen in FIG. 9. A cross member 210 adds rigidity to the system and provides for attachment of the cushion assemblies 68 and 72. The swing arms thus formed are pivotally mounted about pivot shafts 212 and 214. The universal joint 206 associated with each drive shaft 200 is located on the axis of the pivot shafts 212 and 214 for optimized performance.

The location of the output shafts 154 and 166 are generally oriented at the same level of the pivot shafts 212 and 214. This arrangement along with the orientation of the output shafts parallel to the centerline of the vehicle reduces the number of gears, universal joints and the like which may be necessary to convey power to the axles. Consequently, power output loss is minimized. Additionally, greater compactness is obtained. Similarly, the location of the entire power system, the air cleaner and the exhaust system inside of the frame 14 also enables the overall system to be very compact. The location of the starter motor above the engine case further aids in that regard.

As stated above, the cylinder block of the second embodiment is oriented relative to the engine case in a manner not described with the first embodiment. The cylinder block 92 is shown to be at an angle relative to the center line of the engine case 90. The cylinder block 92 extends outwardly from the engine case 90 as can best be seen in FIG. 10 and is angled or inclined toward the portion of the engine case 90 containing the speed change transmission. Normally, engines having an integral crank case and transmission case are oriented with the cylinder blocks inclined away from the speed change transmission. However, by the present orientation, the cylinder block 92, the cylinder head 94 and the head cover 96 do not extend laterally beyond the extension case 90. Additionally, the carburetor 100 and exhaust pipes 102 similarly do not extend laterally beyond the engine case 90.

Thus, a plurality of embodiments for power train arrangements have been illustrated which employ a minimum of space to properly accommodate additional features of a vehicle having front and rear wheel drive. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A four-wheel drive vehicle of the type wherein the rider straddles the vehicle, comprising:
   a frame supportive of said rider and containing structural members arranged for mounting an engine and drive elements therefrom;
   rotatable drive shafts driven by said drive elements disposed forwardly and rearwardly, respectively, of said frame;
   each of said drive shafts connecting wheels at their opposite ends, said wheels being disposed laterally outwardly of said frame;
   front and rear swing arms each having one end pivotally connected to said frame and their free ends mounting each of the respective drive shafts for rotation;
   front and rear cushion members operatively connected between said swing arms and said frame;
   a head tube on the forward end of said frame;
   a steering mechanism operatively supported by said head tube;
   said front swing arm comprising an integrated assemblage of structural members including opposed sides diverging outwardly from the pivoted end of said swing arm and terminating closely adjacent the forwardly disposed wheels of said vehicle;
   steering hubs rotatably mounting each of said front wheels, said steering hubs being pivotally attached to the opposed sides of the free end of said front swing arm; and
   said steering mechanism operatively connecting each of said steering hubs.

2. The vehicle as recited in claim 1 in which said front and rear cushion members are each disposed substantially on the longitudinal central axis of said vehicle.

3. The vehicle as recited in claim 2 in which said front and rear cushion members are inclined downwardly forwardly and rearwardly, respectively, between said frame and the respective swing arms.

4. The vehicle as recited in claim 1 in which said drive elements operatively connecting between said engine and the respective drive shafts are mutually oppositely offset from the longitudinal axis of said frame.

5. The vehicle as recited in claim 4 in which the connection between said front cushion member and said frame is laterally offset from said frame axis in a direction opposite that of the offset of the connection of said drive elements to the drive shaft connecting said forwardly disposed wheels.

6. The vehicle as recited in claim 5 in which said head tube supporting said steering mechanism is disposed between the connection of said front cushion member to the frame and the connection of said drive elements and said forwardly disposed wheels.

* * * * *